United States Patent [19]
Rosback

[11] 3,921,501
[45] Nov. 25, 1975

[54] SEQUENTIALLY ACTUATED SERVOMOTOR WITH A PRESSURE DIFFERENTIAL LIMITER

[75] Inventor: Richard H. Rosback, South Bend, Ind.

[73] Assignee: The Bendix Corporation, South Bend, Ind.

[22] Filed: Sept. 3, 1974

[21] Appl. No.: 502,995

[52] U.S. Cl. .................. 91/32; 91/376 R; 91/422; 91/437
[51] Int. Cl.[2] ............................................ F15B 9/10
[58] Field of Search .............................. 91/6, 31, 32

[56] References Cited
UNITED STATES PATENTS
3,780,620  12/1973  Gardner ............................ 91/6
3,831,489  8/1974  Woo ................................. 91/32

Primary Examiner—Paul E. Maslowsky
Attorney, Agent, or Firm—Leo H. McCormick, Jr.; William N. Antonis

[57] ABSTRACT

A servomotor having a movable wall responsive to a pressure differential sequentially developed between vacuum and air at atmospheric pressure and vacuum and air above atmospheric pressure for supplying a brake actuator with an input force to operate a braking system. A series of poppet valves responsive to the movement of a plunger will control the sequential development of the pressure differential. A relief valve located in the wall will place an upper limit on the development of the pressure differential to assure that the input force that is created will not harm the braking system.

7 Claims, 1 Drawing Figure

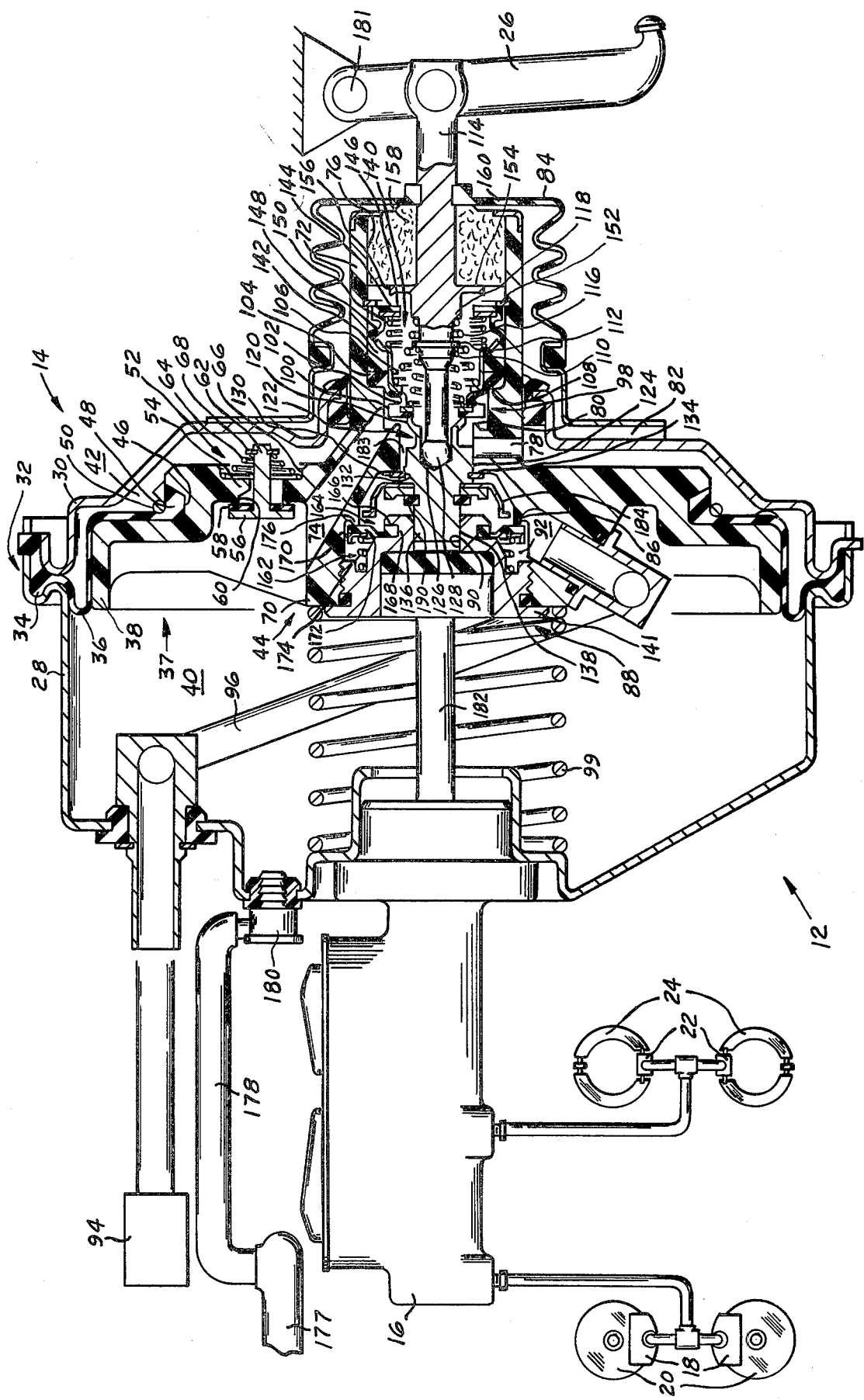

SEQUENTIALLY ACTUATED SERVOMOTOR WITH A PRESSURE DIFFERENTIAL LIMITER

BACKGROUND OF THE INVENTION

Car manufacturers in the United States in an attempt to increase the over-all efficiency of fuel consumption are trying to reduce the weight of vehicles; however, the add-on required safety equipment such as 10 mph safety bumpers, roll bars, emission controls, more effective braking system, etc. have nullified much of the weight reduction achieved by lighter weight frames, engine changes, etc.

The effectiveness of a differential pressure operated braking system is directly dependent upon the creation of vacuum at the intake manifold. However, most of the presently proposed emission control systems reduce the production of vacuum at the intake manifold. Under some braking conditions, it is possible that the pressure differential across the power producing movable wall of the servomotor will be insufficient to stop a vehicle with a normal pedal effort.

In U.S. Pat. No. Re 28,191, incorporated herein by reference, it is disclosed how air above atmospheric pressure and vacuum can be presented to a servomotor for the creation of an operational braking force. However, under test conditions it has been determined that air at atmospheric pressure and vacuum are present in a sufficient intensity to stop most vehicles during normal braking.

In U.S. Pat. No. 3,831,489, incorporated by reference, it is disclosed how a servomotor may be sequentially presented with air at atmospheric pressure and air above atmospheric pressure by selected positioning of a valve means actuated by movement of a plunger. In this servomotor, the air above atmospheric pressure is directly communicated to the rear chamber. In the event that the valve is repeatedly oscillated by an operator within a short period of time, it is possible to deplete the source of air above atmospheric pressure and thereby eliminate the effectiveness of the servomotor in a braking situation.

In U.S. Pat. No. 3,880,049, incorporated herein by reference, it is disclosed how a plunger can sequentially operate a first valve and second valve to uniformly create an operational pressure differential between vacuum and air at atmospheric pressure and air above atmospheric pressure for actuating a braking system. In such a system the intensity of the pressure differential developed by the air above atmospheric pressure under some conditions can vary sufficiently to cause damages to the braking system.

SUMMARY OF THE INVENTION

I have devised a servomotor having an actuator means for sequentially operating a first poppet valve means to develop a first operational pressure differential across a movable wall between vacuum and air at atmospheric pressure in a first mode, a second poppet valve means to interrupt the communication of air to the servomotor in a second mode, and a third poppet valve means to develop a second operational pressure differential across the movable wall between vacuum and air above atmospheric pressure in a third mode. A check valve means connected to the movable wall will limit the maximum pressure differential which can be developed during any of the modes of operation to protect the braking system from an excessive operational pressure which could cause damage to the braking system.

It is therefore the object of this invention to provide a servomotor with an actuator means for sequentially operating a control means to initially develop an operational pressure differential between vacuum and air at atmospheric pressure and subsequently between vacuum and air above atmospheric pressure in response to an input force.

It is another object of this invention to provide a servomotor with a relief means to limit the pressure differential developed across a movable wall upon sequential actuation of a control means shifting the operational force from air at atmospheric pressure to air above atmospheric pressure.

It is a further object of this invention to provide a servomotor with an actuator for positively actuating a series of valve means to develop an operational pressure differential between vacuum and air at atmospheric pressure and air above atmospheric pressure which will produce a uniform output force for actuating a fluid pressurizing device.

These and other objects will become apparent from reading this specification and viewing the drawings.

BRIEF DESCRIPTION OF THE DRAWING

The drawing is a sectional view of a sequentially operated servomotor having a limiting means to prevent the development of an excessive output force capable of damaging a braking system.

DETAILED DESCRIPTION OF THE PREFERRED EMBODIMENT

The vehicle braking system 12 shown in the drawing consists of a servomotor 14 attached to a master cylinder 16 for supplying pressurized hydraulic fluid to wheel cylinders 18 of the front brakes 20 and to wheel cylinders 22 of the rear wheel brakes 24 in response to an operator input to brake pedal 26.

The servomotor 14 has a front shell 28 joined to a rear shell 30 by a twist lock connection 32. The twist lock connection 32 holds external bead 34 of diaphragm 36 in a sealed condition. The diaphragm 36 and backing plate 38 form a wall means 37 which separates the interior of the servomotor into a front chamber 40 and rear chamber 42. The backing plate 38 which extends radially from the first hub means 44 has a groove 46 into which the internal bead 48 of the diaphragm 36 is snapped into place. A wire bail 50 acts on the bead 48 to additionally maintain a sealed connection between the front chamber 40 and the rear chamber 42.

A relief valve means 42 is located in an opening 54 which connects the front chamber 40 with the rear chamber 42 for limiting the maximum pressure differential which can occur across the wall means 37.

The relief valve means 52 has a disc 56 with a resilient surface 58 thereon for engaging a seat 60 in the backing plate 38. A stem 62 attached to the disc 56 extends into the rear chamber 42. A spring 64 located in an annular guide surface 66 on the backing plate 38 engages a retainer 68 on the stem 62 to urge the resilient surface 58 against seat 60 to seal opening 54.

The first hub means 44 has a housing 70 with a rearward projection 72 which extends through the rear shell 30. The housing 70 has a first passage 74 which connects the front chamber 40 with bore 76. A second passage 78 located inwardly from a vacuum seat 80, connects bore 76 with the rear chamber 42. A boot 84 attached to the rear shell 30 which surrounds the rearward projection 72 encloses the rear shell 30. A third passage 82 connects bore 76 with the atmosphere. The housing 70 has a rib 86 adjacent the end thereof for establishing an air above atmospheric pressure seat.

A second hub means 88 has a bore 90 with a coaxial chamber 92. The chamber 92 is connected to a source 94 of air above atmospheric pressure through conduit 96. The conduit 96 is coiled around return spring 98 to prevent interference upon movement of the wall means 37.

A first vlave means 98 located in the bore 76 of the first hub means 44 consists of an annular poppet member 100 which is attached to a flexible tubular portion 102. The tubular portion 102 has a thickened end 104 which is fixed against shoulder 108 in the bore 76 by retainer 106. Thus, the poppet member 100 is free to move axially within the bore 76. A first spring 110 located between the poppet member 100 and a first stop 112 on push rod 114 urges the poppet member 100 toward a rib or vacuum seat 80 on the housing 70. A return spring 116 located between the retainer 106 and a second stop or shoulder 118 urges atmospheric seat 120 on the plunger means 122 toward the poppet member 100 to prevent air at atmospheric pressure from entering the second passage 78 in the first hub means 44.

The plunger means 122 has a cylindrical body 124 with an axial bore 126 into which spherical head 128 of the push rod 114 is retained. A snap ring 130 located in a groove 132 engages shoulder 134 to limit the rearward movement through which spring 116 can return the push rod 114. A guide surface 136 extends from the cylindrical body 124 into a bearing and guide surface 138 in the housing 140 of the second hub means 88 to maintain the plunger means 122 in axial alignment with respect to the bore 76 in the first hub means 44.

A second valve means 140 located within the axial bore 76 has a poppet member 144 with a first end 142 held against the thickened end 104 of the poppet member 100 by retainer 106 and a second end 146 which is free to move axially within the bore 76 as flexible section 148 flexes. A spring or resilient member 150 is located between the retainer 106 and the second end 146 to hold poppet member 144 against stop 152. An annular shoulder 154 radiating from the push rod 114 has a seat 156 for engaging the poppet 144 upon a predetermined movement of the plunger means 122.

A filter 158 is located on the push rod 114 between the annular shoulder 156 and end 160 of boot 84 will prevent contaminated air from entering the axial bore 76 and affecting the operation of the first and second valve means 98 and 140, respectively.

A third valve means 162 is located in chamber 92 of the second hub means to prevent air above atmospheric pressure from being communicated to the second passage 78. The third valve means 162 includes a poppet member 164 which has a first end 166 fixed into a groove 168 in the housing 140 and separated from a free end 170 by a flexible section 172. A spring 174 located between the housing 141 and the free end 170 urges the poppet 164 against a seat 176 to prevent air above atmospheric pressure from escaping from chamber 92 in the axial bore 76.

MODE OF OPERATION OF THE PREFERRED EMBODIMENT

With the motor of the vehicle running, vacuum will be produced at the intake manifold 177. This vacuum will be communicated through conduit 178 past check valve 180 into the front chamber 40 of the servomotor 14. This vacuum will evacuate any air present in the rear chamber 42 by way of the second passage 78, bore 76, and first passage 74 to permit return spring 99 to hold the wall means 37 against the rear shell 30.

Upon the operator desiring to stop the vehicle, an input force is applied to brake pedal 26. This input force is transmitted into linear movement as the pedal 26 pivots on pin 181. Initial movement of the push rod 114 will position the poppet member 98 on the vacuum seat 80 to interrupt communication of vacuum from the front chamber 40 to the rear chamber 42 by the first passage 74. Further movement of the push rod 114 will move the atmospheric seat 120 on plunger means 122 away from the poppet member 100 to allow air at atmospheric pressure to flow through the third passage around the boot means 84 into bore 76 and into the rear chamber 42 by way of the second passage 78.

With air at atmospheric pressure in the rear chamber 42 and vacuum in the front chamber 40, a pressure differential will be created across the wall means 37. This pressure differential will develop an operational force which will be transmitted through the housing 70 into the second hub means 88. As the operational force increases, the wall means 37 will be correspondingly moved to relay an operational force through push rod 182 to actuate the master cylinder 16.

If the operational pressure differential between vacuum and air at atmospheric pressure is insufficient to produce an adequate braking force, futher input will be applied to the brake pedal 26. This further input force will simultaneously move the axial groove 183 on the cylindrical surface 124 past shoulder 134, and bring seat 156 into contact with poppet 144 to interrupt communication of air at atmospheric pressure into the axial passage 76. Still further movement of the plunger means 122 will bring arm 184 into contact with poppet 164 to overcome spring 174 and allow air above atmospheric pressure present in chamber 92 to enter the axial bore 76 and pass into the rear chamber 42 through the second passage 78.

With air above atmospheric pressure in the rear chamber 42 and vacuum in the front chamber 40, an operational pressure differential will be created to move the wall means 37 and operate the brake actuator or master cylinder 16. If this potential operational pressure differential which could be developed between vacuum in the front chamber 40 and air above atmospheric pressure is above a predetermined value, check valve means 52 will open to reduce this pressure differential by allowing a portion of the air above atmospheric pressure to enter the front chamber 40. Thus, the braking system will be protected from fluctuation in the vacuum level and the source of air above atmospheric pressure.

Upon termination of the input force on the brake pedal 26, spring 174 will seat poppet 164 on seat 176, spring 110 will hold atmospheric seat 120 on poppet 100 and return spring 116 will move push rod 114 and attached plunger means 122 rearwardly until snap ring 130 engages the shoulder one stop 134. In this position vacuum available in the front chamber 40 will evacuate air from the rear chamber 42 to permit return spring 99 to move wall means 37 into contact with the rear shell 30.

In case of a panic stop, when the operator applies a rapid input to the brake pedal 26, the resilient bumper means 190 will absorb a portion of the input force to permit air at atmospheric pressure to enter into the rear chamber 42. In this manner, the third valve means 162 will not be activated until such time that the pressure differential between vacuum and air at atmospheric pressure is established.

In addition if vacuum is unavailable in the front chamber 40, a pressure differential between air and air above atmospheric pressure can create an operational force for energizing the master cylinder 16.

I claim:

1. In a servomotor having a wall means for separating a front chamber from a rear chamber, control means for sequentially regulating the communication of vacuum, air at atmospheric pressure and air above atmospheric pressure to the rear chamber to develop an operational force from a pressure differential across the wall means to operate a brake actuator in response to an input force, said control means comprising:
   first hub means connected to said wall means having a first housing with a first axial bore therein, said first housing having a first passage connecting the first axial bore with the front chamber, said first housing having a second passage connecting the first axial bore with the rear chamber;
   second hub means connected to said first hub means for transmitting the operational force to said brake actuator from said wall means, said second hub means having a second housing with a second axial bore coaxial to said first axial bore, said second housing having an entrance port through which air above atmospheric pressure is communicated to the second axial bore, a first annular poppet means having a first end fixed to said first hub means and a second end loosely located in said first axial bore for controlling the communication of vacuum through the first passage in a first mode of operation;
   a second annular poppet having a first end fixed to said first hub means and a second end loosely located in the first axial bore for controlling the communication of air at atmospheric pressure through the first axial bore in a second mode of operation;
   third valve means located in said second axial bore for controlling the communication of air above atmospheric pressure from the second bore in a third mode of operation;
   actuator means located in said first and second axial bores for progressively operating the first, second and third valve means in response to said input force, said first valve means upon movement of the actuator means interrupting communication of vacuum to the second passage to allow air at atmospheric pressure present in the axial bore to flow through the second passage into the rear chamber to develop said pressure differential, said second valve means upon further movement of said actuator means interrupting the flow of air at atmospheric pressure, said third valve means upon still further movement of said actuator means allowing air above atmospheric pressure to enter the second passage to develop said pressure differential;
   a first resilient means located between the actuator means and the first annular poppet means, said first resilient means urging the first annular poppet into contact with the actuator means to allow vacuum to evacuate air from the rear chamber in said first mode of operation, said first resilient means urging the first annular poppet into contact with a vacuum seat on the first hub means in said second mode of operation to allow said pressure differential to develop; and
   a second resilient means located between said first hub means and said second annular poppet, said second resilient means urging the second annular poppet into contact with a stop on the first hub means during said first and second modes of operation to allow air at atmospheric pressure to freely be communicated to said first valve means and into contact with the actuator means during said third mode of operation to prevent air above atmospheric pressure from escaping through the axial bore into the atmosphere.

2. In the servomotor, as recited in claim 1, wherein said control means further includes:
   relief valve means located in said wall means for limiting the pressure differential in said third mode of operation.

3. The servomotor, as recited in claim 1, wherein said third valve means includes:
   a third annular poppet having a first end fixed to the second hub means and a second end loosely located in said second axial bore; and
   a third resilient means located between the second hub means and the third annular poppet, said third resilient means urging the third annular poppet into contact with a high pressure seat during the first and second modes of operation, said actuator means engaging the third annular poppet and overcoming said third resilient means during the third mode of operation.

4. The servomotor, as recited in claim 3, wherein said actuator means includes:
   plunger means having a first bearing surface located in the first axial bore and a second bearing surface located in the second axial bore, said first bearing surface having a rearward projection for establishing an atmospheric seat which will engage said first annular poppet in said first mode of operation, said second bearing surface having a radially projecting arm extending therefrom for engaging said third annular poppet and allow air above atmospheric pressure to enter the second axial bore in the third mode of operation.

5. The servomotor, as recited in claim 4, wherein said actuator means further includes:
   push rod means having a spherical head for engaging the plunger means and a connector for transmitting linear movement to the plunger means in response to an input force from an operator, said push rod means having a first shoulder for engaging said first resilient means, a second shoulder, and a third shoulder, said third shoulder having a seat thereon for engaging the second poppet means and sealing the first axial bore during the third mode of operation.

6. In the servomotor, as recited in claim 5, wherein said control means further includes:

relief valve means located in said wall means for limiting the pressure differential in said third mode of operation.

7. In the servomotor, as recited in claim 6, wherein said relief valve means includes:
  disc means located in said front chamber;
  stem means attached to said disc means and extending through the wall means into the rear chamber; and
  spring means located between said wall and a retainer on said stem means, said spring means holding the disc means against the wall means, said spring means responding to pressure differential created in the second and third modes of operation to limit the operational output to the brake actuator.

\* \* \* \* \*